United States Patent
Gu et al.

(10) Patent No.: US 10,628,295 B2
(45) Date of Patent: Apr. 21, 2020

(54) COMPUTING MECHANISMS USING LOOKUP TABLES STORED ON MEMORY

(71) Applicant: Samsung Electronics Co., Ltd., Suwon-si, Gyeonggi-do (KR)

(72) Inventors: Peng Gu, Santa Barbara, CA (US); Krishna T. Malladi, San Jose, CA (US); Hongzhong Zheng, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 15/913,758

(22) Filed: Mar. 6, 2018

(65) Prior Publication Data

US 2019/0196953 A1    Jun. 27, 2019

Related U.S. Application Data

(60) Provisional application No. 62/610,439, filed on Dec. 26, 2017.

(51) Int. Cl.
| | | |
|---|---|---|
| *G06F 9/30* | (2018.01) | |
| *G06F 12/02* | (2006.01) | |
| *G06F 17/16* | (2006.01) | |
| *G06F 7/00* | (2006.01) | |
| *G06F 7/487* | (2006.01) | |

(52) U.S. Cl.
CPC ............ *G06F 12/0207* (2013.01); *G06F 7/00* (2013.01); *G06F 7/4876* (2013.01); *G06F 9/3001* (2013.01); *G06F 17/16* (2013.01); *G06F 2212/1024* (2013.01)

(58) Field of Classification Search
None
See application file for complete search history.

(56) References Cited

U.S. PATENT DOCUMENTS

| | | | |
|---|---|---|---|
| 7,710,972 B2 | 5/2010 | Gurumurthy | |
| 8,943,119 B2 | 1/2015 | Hansen et al. | |
| 9,195,784 B2 | 11/2015 | Tseng et al. | |
| 10,359,832 B2* | 7/2019 | John | G06F 17/142 |
| 2004/0049497 A1* | 3/2004 | Curry | G06T 3/4007 |
| 2011/0307233 A1* | 12/2011 | Tseng | G06F 17/5022 703/14 |
| 2012/0215826 A1* | 8/2012 | Hansen | G06F 7/5338 708/607 |

* cited by examiner

*Primary Examiner* — William B Partridge
(74) *Attorney, Agent, or Firm* — Lewis Roca Rothgerber Christie LLP

(57) ABSTRACT

According to some example embodiments of the present disclosure, in a method for a memory lookup mechanism in a high-bandwidth memory system, the method includes: using a memory die to conduct a multiplication operation using a lookup table (LUT) methodology by accessing a LUT, which includes floating point operation results, stored on the memory die; sending, by the memory die, a result of the multiplication operation to a logic die including a processor and a buffer; and conducting, by the logic die, a matrix multiplication operation using computation units.

19 Claims, 7 Drawing Sheets

COMPUTING MECHANISMS USING LOOKUP TABLES STORED ON MEMORY

CROSS-REFERENCE TO RELATED APPLICATION(S)

The present application claims priority to, and the benefit of, U.S. Provisional Patent Application No. 62/610,439 filed on Dec. 26, 2017, the contents of which are incorporated herein by reference in its entirety.

BACKGROUND

1. Field

One or more aspects of embodiments disclosed herein relate to a high-bandwidth memory lookup mechanism system.

2. Description of Related Art

Emerging applications like deep neural networks use massive computational and memory abilities to train on different datasets and to learn with high accuracy. Moreover, as applications like High Performance Computing (HPC) graphic algorithms become computationally intensive, energy-efficiency and low latency become increasingly important.

As a result, there is a significant increase in demand for memory and computational resources such as memory for storing weights and intermediate results and computation mainly used for acceleration of Basic Linear Algebra Subprograms (BLAS) and General Matrix to Matrix Multiplication (GEMM) kernels.

SUMMARY

Aspects of embodiments of the present disclosure are directed toward a memory lookup mechanism in a high-bandwidth memory system.

According to some example embodiments of the present disclosure, in a method for a memory lookup mechanism in a high-bandwidth memory system, the method includes: using a memory die to conduct a multiplication operation using a lookup table (LUT) methodology by accessing a LUT, which includes floating point operation results, stored on the memory die; sending, by the memory die, a result of the multiplication operation to a logic die including a processor and a buffer; and conducting, by the logic die, a matrix multiplication operation using computation units.

According to some example embodiments, the LUT methodology includes a floating point full product multiplication method including: using, by the memory die, a whole scalar floating point input to retrieve a whole scalar multiplication result from the LUT, the LUT including whole product multiplication results; sending, by the memory die, the whole scalar multiplication result of from the LUT to the buffer; sending, by the buffer, the whole scalar multiplication result to an accumulator on the logic die; and accumulating, by the accumulator, the whole scalar multiplication result.

According to some example embodiments, the LUT methodology includes a floating point partial product multiplication method including: using, by the memory die, a fraction scalar floating point input to retrieve a partial product multiplication result from the LUT, which includes partial product multiplication results; sending, by the memory die, the partial product multiplication result to the buffer; sending, by the buffer, the partial product multiplication result to an adjustor on the logic die; sending, by the adjustor, the product multiplication result to an accumulator on the logic die; and accumulating, by the accumulator, the product multiplication result.

According to some example embodiments, the LUT methodology includes a floating point tensor operation method, the floating point tensor operation method including: using, by the memory die, a tensor floating point input to retrieve a tensor multiplication result from the LUT, the LUT including tensor multiplication results; sending, by the memory die, the tensor multiplication result to the buffer; and sending, by the buffer, the tensor multiplication result to a tensor post-processor on the logic die.

According to some example embodiments, the LUT methodology includes a floating point fused layer operation method, the method including: using, by the memory die, a whole scalar floating point to retrieve a whole scalar multiplication result from the LUT, which includes whole product multiplication results; sending, by the memory die, the whole product multiplication results to a buffer die including a plurality of buffers separate from the buffer of the logic die; sending, by the buffer die, the whole product multiplication result to the buffer of the logic die; and sending, by the buffer of the logic die, the whole product multiplication result to a tensor processor on the logic die.

According to some example embodiments, the method further includes storing the LUT associated with a first type of operation on the memory die; and storing the LUT associated with a second type of operation that is different from the first type of operation on the memory die.

According to some example embodiments, the method further includes reading every possible location in a first layer input feature map; convolving with the first layer input feature map with a first layer kernel; and generating results of a second layer input feature map based on the convolving.

According to some example embodiments of the present disclosure, a high-bandwidth memory lookup mechanism system includes: a logic die including a processor and a buffer, wherein the processor conducts a matrix multiplication operation using computational units; and a memory die including a lookup table (LUT), wherein the LUT includes floating point operation results.

According to some example embodiments, the memory die performs operations including: accessing the LUT; conducting a multiplication operation using a LUT methodology; and sending a result of the multiplication operation to the logic die.

According to some example embodiments, the memory die performs operations further including: using a whole scalar floating point input to retrieve a whole scalar multiplication result from the LUT including whole product multiplication results; and sending the whole scalar multiplication result from the LUT to the buffer.

According to some example embodiments, the logic die further includes an accumulator, the accumulator performing operations including: receiving the whole scalar multiplication result from the buffer; and accumulating the whole scalar multiplication result.

According to some example embodiments, the memory die performs operations further including: using a fraction scalar floating point input to retrieve a partial product multiplication result from the LUT, which includes partial product multiplication results; and sending the partial product multiplication result to the buffer.

According to some example embodiments, the logic die further includes: an adjustor, the adjustor receiving the partial product multiplication result from the buffer; and an accumulator, the accumulator performing operations including: receiving the partial product multiplication result from the adjustor; and accumulating the partial product multiplication result.

According to some example embodiments, the memory die performs operations further including: using a tensor floating point input to retrieve a tensor multiplication result from the LUT including tensor multiplication results; and sending the tensor multiplication result to the buffer.

According to some example embodiments, the logic die further includes a tensor post-processor receiving the tensor multiplication result from the buffer.

According to some example embodiments, the memory die performs operations further including: using a whole scalar floating point to retrieve a whole scalar multiplication result from the LUT, which includes whole product multiplication results; and sending the whole product multiplication results to a buffer die.

According to some example embodiments, the logic die further includes a tensor processor, the processor receiving the whole product multiplication result from the buffer die.

According to some example embodiments, the logic die further includes an accelerator die.

According to some example embodiments, the memory die includes a dynamic random access memory (DRAM) die.

According to some example embodiments of the present disclosure, a memory die includes a lookup table (LUT) stored thereon, and is configured to perform: a floating point full product multiplication method including: using, by the memory die, a whole scalar floating point input to retrieve a whole scalar multiplication result from the LUT, the LUT including whole product multiplication results; sending, by a buffer, the whole scalar multiplication result to an accumulator; and accumulating, by the accumulator, the whole scalar multiplication result; a floating point partial product multiplication method including: using, by the memory die, a fraction scalar floating point input to retrieve a partial product multiplication result from the LUT, the LUT including partial product multiplication results; sending, by the memory die, the partial product multiplication result to the buffer; sending, by the buffer, the partial product multiplication result to an adjustor; accumulating, by the accumulator, the partial product multiplication result; a floating point tensor operation method including: using, by the memory die, a tensor floating point input to retrieve a tensor multiplication result from the LUT, the LUT including tensor multiplication results; sending, by the memory die, the tensor multiplication result to the buffer; sending, by the buffer, the tensor multiplication result to a tensor post-processor; and a floating point fused layer operation method including: using, by the memory die, a whole scalar floating point to retrieve a whole scalar multiplication result from the LUT, which includes whole product multiplication results; sending, by the memory die, the whole product multiplication results to a buffer die including a plurality of buffers; sending, by the buffer die, the whole product multiplication result to the buffer; and sending, by the buffer, the whole product multiplication result to a tensor processor.

BRIEF DESCRIPTION OF THE DRAWINGS

Some embodiments can be understood in more detail from the following description taken in conjunction with the accompanying drawings, in which.

DETAILED DESCRIPTION

Figure 1A:
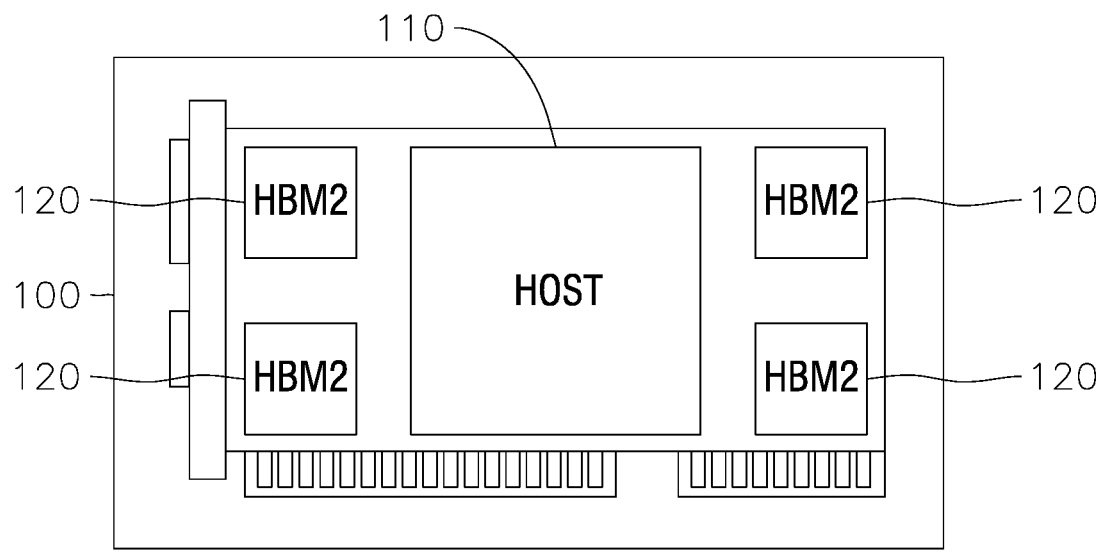
FIGS. 1A and 1B are block diagrams of an architecture of a second generation high-bandwidth memory HBM2 system according to one or more embodiments of the present disclosure.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of embodiments of the present disclosure may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the disclosure refers to "one or more embodiments of the disclosure." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the disclosure described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the disclosure.

Unless otherwise defined, all terms (including technical and scientific terms) used herein have the same meaning as commonly understood by one of ordinary skill in the art to which embodiments of the disclosure belong. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Large data batch sizes are used to shorten total training time without losing accuracy. This approach can scale-up by increasing utilization of computation/memory utilization on a single high-performance process. Alternatively, this approach can scale out by distributing learning on multiple high-performance processors using model parallelism and data parallelism.

Deep learning applications exhibit various compute-to-memory ratios. Convolutional layers have high compute-to-memory ratios. Fully connected layers/recurrent layers have medium-low compute-to-memory ratios. Elementwise/scalar operations have low compute-to-memory ratios. Application wise compute-to-memory ratio depends on the above combination.

For low compute-to-memory ratio workloads, compute-centric throughput processors may suitably use large memory capacity and bandwidth. On-chip memory cannot contain large batch size data nor large layer size data. State of the art processors, such as graphics processing units (GPUs), central processing units (CPUs), and field-programmable gate arrays (FGPAs), employ High Bandwidth Memory (HBM). For high computer-to-memory ratio workloads, if the workload is computation bound, memory bandwidth and memory capacity is under-utilized.

Figure 1B:
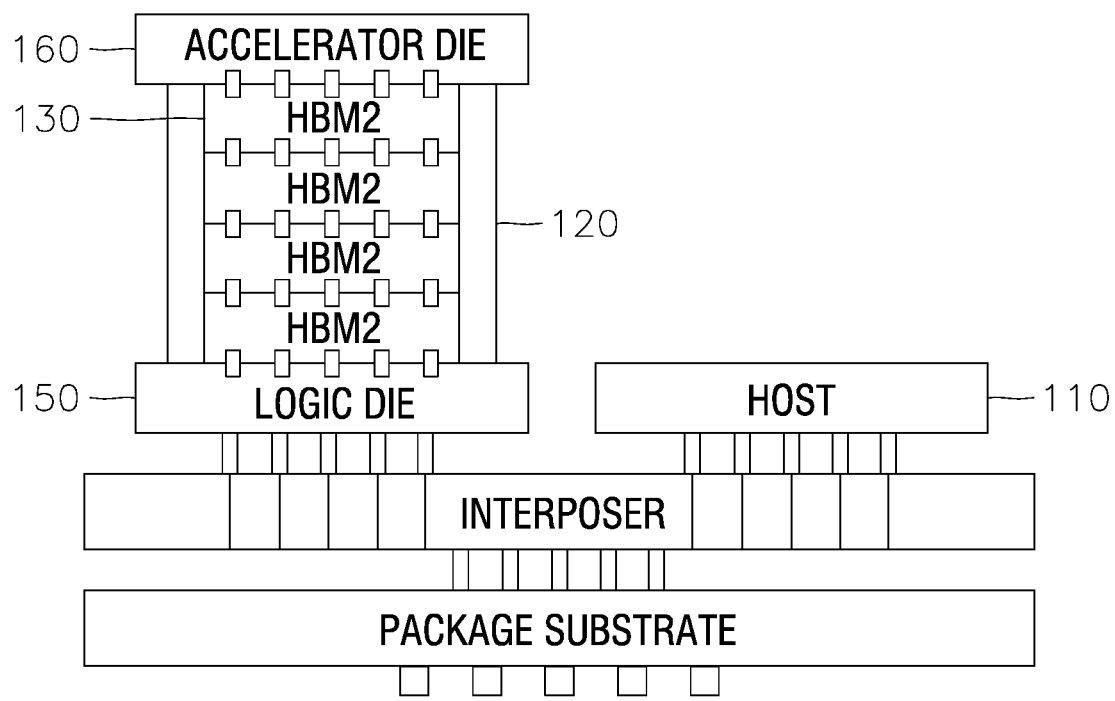

FIGS. 1A and 1B are block diagrams of an architecture of a second generation high-bandwidth memory ("HBM2") system according to one or more embodiments of the present disclosure. FIG. 1A provides an aerial view of the architecture. FIG. 1B provides a side view of the architecture.

Referring to FIG. 1A, embodiments of the present disclosure provide a system for memory lookup computer mechanism, or a second generation of High Bandwidth Memory (HBM2) system 100. The HBM2 system 100 contains a multiple host die 110 connected to multiple three-dimensional HBM2 memory stacks 120. According to various embodiments, the multiple host die 110 can be connected to up to four HBM2 memory stacks 120.

Referring to FIG. 1B, the three-dimensional HBM2 memory stack 120 contains multiple HBM2 memory dies 130. As illustrated, the stacks 120 may have 4 to 8 memory dies 130 per stack 120. Each stack 120 may contain up to eight channels per stack 120. In some embodiments, the memory stack 120 may be positioned upon a logic die 150. In some embodiments, an operational accelerator die 160 may be placed on top of the stack 120.

Part of the memory stacks 120 are configured as a lookup table ("LUT") to utilize bank-level parallelism. Lookup tables are stored on the memory dies 130. The LUTs contain results (e.g., pre-computed results) of floating point operations. The results are real number values. The results contained in the LUTs on the memory dies 130 can be streamed to the logic die 150.

FIGS. 2A-2D are block diagrams illustrating design options in accordance with one or more embodiments of the disclosure.

Figure 2A:
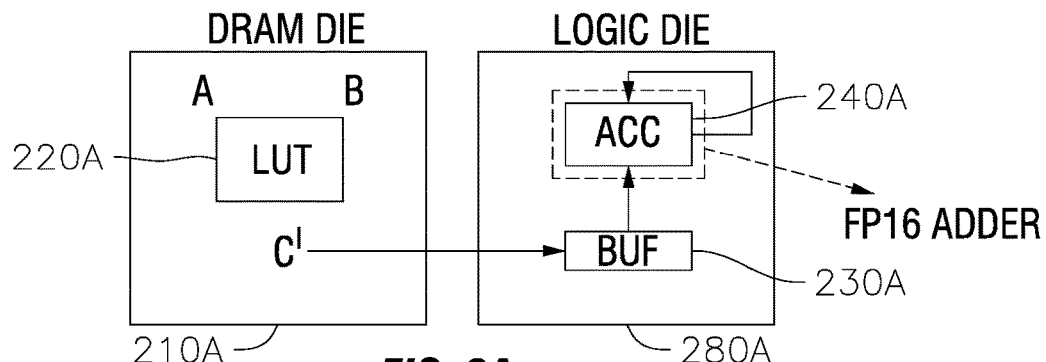
FIGS. 2A-2D are block diagrams illustrating design options in accordance with one or more embodiments of the disclosure.

FIG. 2A shows one embodiment of the memory lookup mechanism. According to the present embodiment, the LUT 220A is located on the DRAM die 210A. The LUT 220A contains real number value results C' of one or more pre-computed floating point operations. In the current embodiments, the real number value results C' may include whole scalar floating point values. The DRAM die 210A retrieves the value/result C' from the LUT 220A. The DRAM die 210A uses input values A and B to identify the results C' in the LUT 220A. The input value A represents the row address of the LUT 220A, and the input value B represents the column address of the LUT 220A. According to this embodiment, the input value A and input value B may include whole scalar floating point values.

The DRAM die 210A transmits the result C' to the buffer ("BUF") 230A located on the logic die 280A. The buffer 230A stores the results C'. The buffer 230A allows for quicker access of the results C' for use in matrix multiplication operations conducted by the logic die 280A in conjunction with the DRAM die 210A. The buffer 230A transmits the result C' to an accumulator ("ACC") 240A. In various embodiments, the accumulator 240A will gather results C' for use in calculating intermediate results of matrix multiplication operations conducted by the logic die 280A and the DRAM die 210A.

Figure 2B:
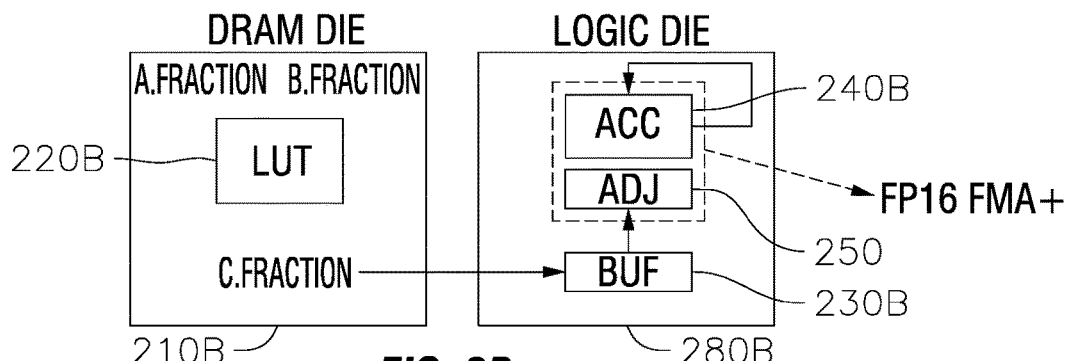

FIG. 2B illustrates a second embodiment of the memory lookup mechanism. According to the present embodiment, the LUT 220B is located on the DRAM die 210B. The LUT 220B stores partial product multiplication results "C.fraction" of pre-computed floating point operations. The DRAM die 210B uses input values "A.fraction" and "B.fraction" to identify the result C.fraction in the LUTs. The A.fraction value represents the row address of the LUT and is a fraction part of input value A. The B.fraction represents the column address of the LUT and is a fraction part of input value B. According to the present embodiment, the A.fraction value and the B.fraction value may include fraction scalar floating point values.

In the present embodiment, the sign logic and exponent addition and subtraction logic are not implemented by the LUT to enable reduction in the size of the LUT. Because input values A.fraction and B.fraction are symmetrical, it is suitable to store only half of the results on the LUT 220B. The reduced size of the LUT 220B allows for more storage space on the DRAM die 210B.

The DRAM die 210B transmits the result C.fraction to the buffer 230B located on the logic die 280B. The buffer 230B stores the result C.fraction. The buffer 230B allows for quicker access of the result C.fraction for use in matrix multiplication operations conducted by the logic die 280B. The buffer 230B streams the result C.fraction to an adjustor ("ADJ") 250. The adjustor 250 aligns/processes the result C.fraction to produce result C'. After alignment, the adjustor 250 transmits the result C' to the accumulator 240B, which is able to effectively achieve the same tasks as the accumulator 240A of FIG. 2A. The accumulator 240B will gather result C' for use in calculating intermediate results of matrix multiplication operations conducted by the logic die 280B.

Figure 2C:
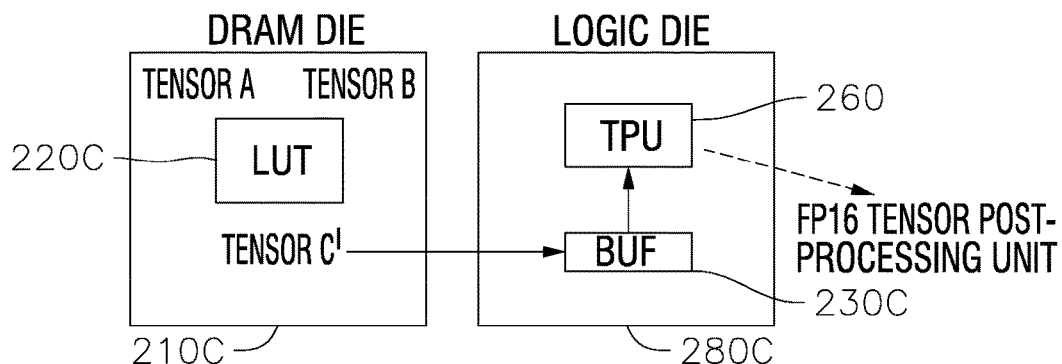

FIG. 2C shows a third embodiment of the memory lookup mechanism. According to the present embodiment, the LUT 220C is located on the DRAM die 210C. The LUT 220C contains tensor value results Tensor C' of pre-computed floating point operations. The DRAM die 210C retrieves the tensor value results Tensor C' from the LUT 220C. The DRAM die 210C uses the row address and column address of the LUT 220C to identify the tensor value results Tensor C'. For the multiplication of Tensor A and Tensor B, the row address is the concatenation of every element in each row of input value A, and the column address is every element in each column of input value B. Input value A and input value B may include tensor floating point values. The row address is equal to the number of elements multiplied by the length of the element. The row index and the column index are assumed to be unsigned integers. Because input values A and B are symmetrical, the LUT 220C only needs to store half of the tensor value results Tensor C'.

In some embodiments, the size of the LUT 220C can be further reduced. Before concatenation, the control engine on DRAM die 210C may sort the tensor value results Tensor C' in the rows and columns according to their absolute value and to their pre-computer sign bit logic. If the row index is larger than the column index, the control engine on DRAM die 210C may switch the row index and the column index. The control engine on DRAM die 210C may assume the row index and column index are unsigned integers. Further, the control engine on DRAM die 210C may use pre-computer sign bit logic to select the LUT 220C for concatenation of the row and column address lookup.

The DRAM die 210C transmits the tensor value results Tensor C' to the buffer 230C located on the logic die 280C. The buffer 230C stores the tensor value results Tensor C'. The buffer 230C allows for quicker access of the tensor value results Tensor C' for use in matrix multiplication operations conducted by the logic die 280C. The buffer 230C transmits the Tensor result C' to the Tensor Post Processing Unit ("TPU") 260, which may contain one or more accumulators, such as the accumulators 240A and 240B of FIGS. 2A and 2B. The TPU 260 functions as an accumulator for tensor results such as Tensor result C'. In various embodiments, the TPU 260 will gather Tensor results C' for us in calculating intermediate results of operations conducted by the logic die 280C.

Figure 2D:
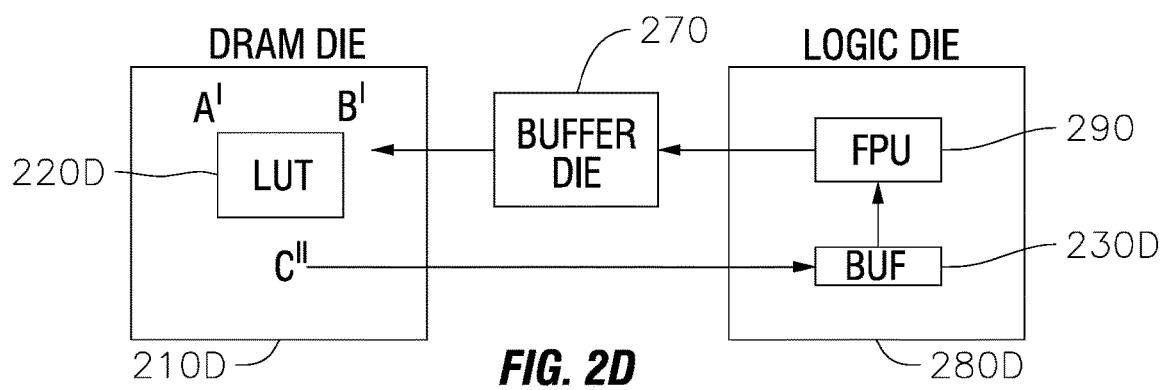

FIG. 2D displays a fourth embodiment of the memory lookup mechanism. According to the present embodiment, the LUT 220D is located on the DRAM die 210D. Furthermore, the present embodiment also includes a buffer die 270. The LUT 220D contains real number value results C''' of pre-computed floating point operations. In the current embodiments, the real number value results C''' may include whole scalar floating point values. The DRAM die 210D retrieves the real number value results C''' from the LUT 220D. The DRAM die 210D uses the input values A' and B' to identify the real number value results C''' in the LUT 220D. The input value A' represents the row address of the LUT 220D, and the input value B' represents the column address of the LUT 220D. According to this embodiment, the input value A' and input value B' may include whole scalar floating point values.

The DRAM die 210D transmits the real number value result C''' to the buffer 230D located on the logic die 280D. The buffer 230D stores the real number value results C'''. The buffer 230D allows for quicker access of the real number value results C''' for use in the matrix multiplication operations conducted by the logic die 280D. The buffer 230D transmits the real number value results C''' to a fused-layer post processor (FPU) 290. In situations where the real number value result C''' is an intermediate value in a series of operations conducted by the logic die 280D, the FPU 290 may transmit the real number value result C''' to a buffer die 270. In some embodiments the buffer die 270 may contain multiple buffers that are similar to the buffer 230D of the logic die 280D. The separate buffer die 270 will allow for wider stores of intermediate results that are suitable for larger and more complex operations.

Figure 3:
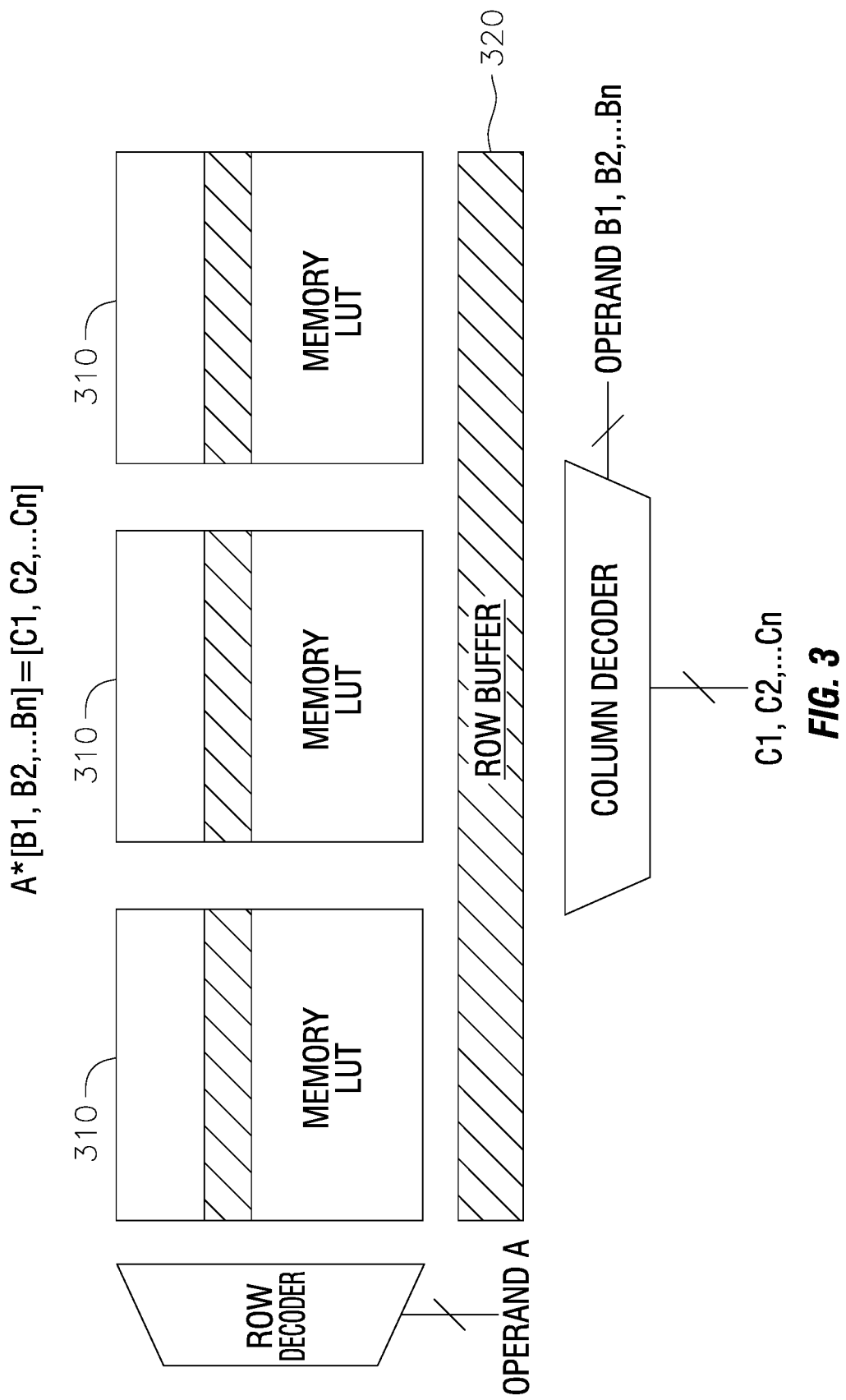
FIG. 3 provides an illustration of how memory LUTs perform scalar-vector multiplication.

FIG. 3 provides an illustration of how memory LUTs perform scalar-vector multiplication.

Referring to FIG. 3, in the process of the present embodiment, scalar A, which is unrelated to input value A, is multiplied by vectors $B_1$-$B_n$. The results of the vector-scalar multiplication are represented by vector products $C_1$-$C_n$. The scalar A is used as a row address to activate one row from the memory LUT 310. The vectors $B_1$-$B_n$ are used as the column addresses to read the corresponding lookup results $C_1$-$C_n$ from the row buffer 320. The results $C_1$-$C_n$ are transferred to the logic die 280 for accumulation, as shown previously in FIGS. 2A-2D.

Figure 4:
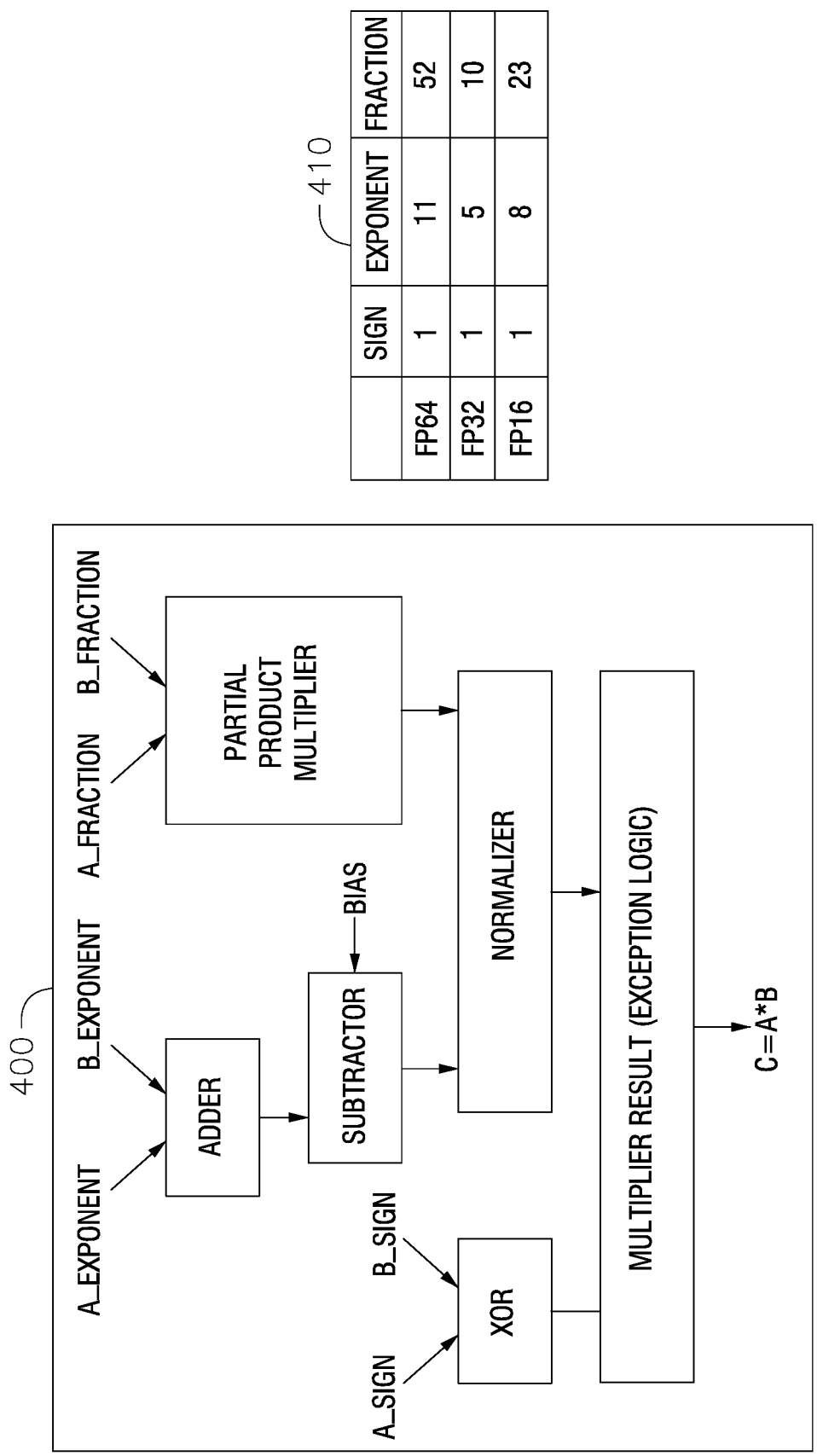
FIG. 4 displays a flow diagram 400 outlining different components of the floating points such as the floating point exponent, fraction, or sign.

FIG. 4 displays a flow diagram 400 outlining different components of the floating points such as the floating point exponent, fraction, or sign.

Referring to FIG. 4, the table 410 displays the number of bits used by each component of the floating point. For example, a 64-bit floating point will have 52 bits for the fraction component, and 11 bits for the exponent component.

Figure 5:
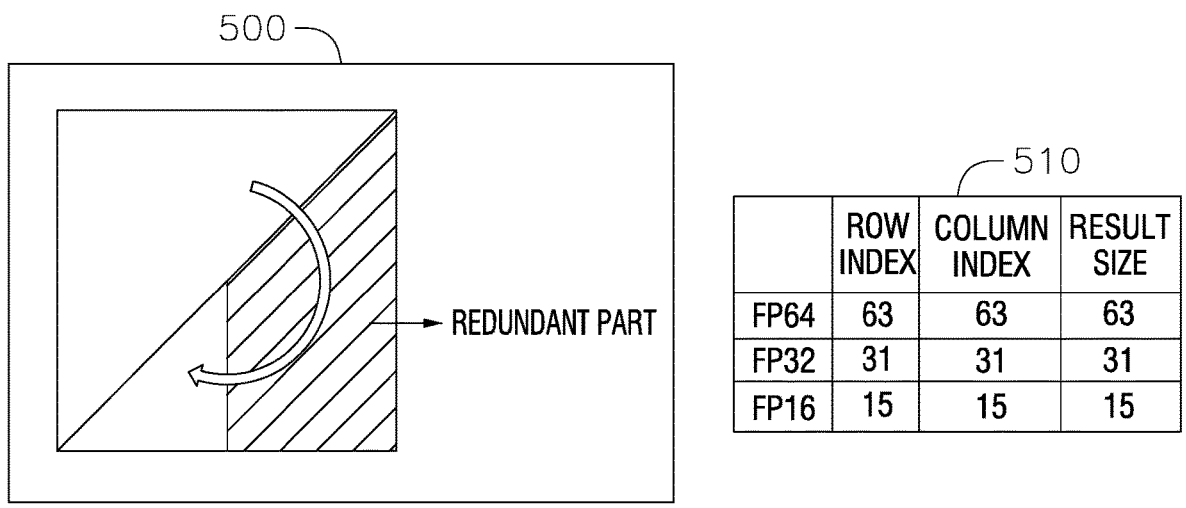
FIG. 5 illustrates a block diagram 500 illustrating redundant sections of a LUT, and a table 510 displaying the number of bits used by the row index, column index, and result size.

FIG. 5 illustrates a block diagram 500 illustrating redundant sections of a LUT, and a table 510 displaying the number of bits used by the row index, column index, and result size.

Referring to FIG. 5, in an example of the present embodiment, a 64-bit floating point has a 63-bit row index, 63-bit column index, and a 63-bit result size.

Figure 6:
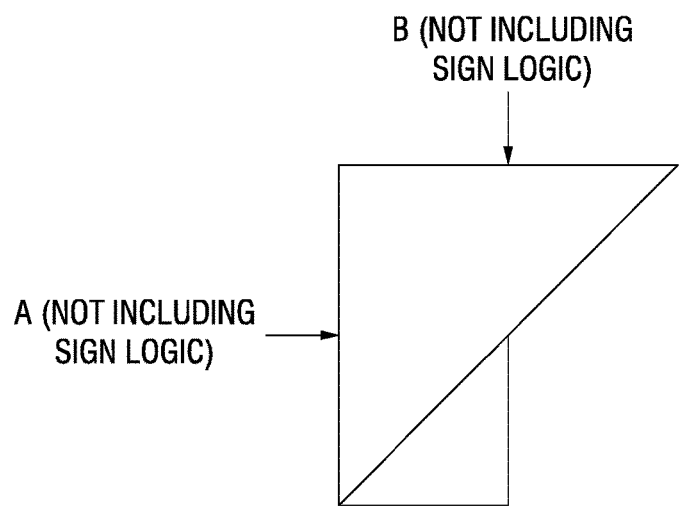
FIG. 6 displays a visual representation of an algorithm that can save memory space by "folding" the LUT.

FIG. 6 displays a visual representation of an algorithm that can save memory space by "folding" the LUT.

Referring to FIG. 6, in the example of the present embodiment, the input values are represented as A and B. As in previous figures, the input value A represents the row address of a LUT and the input value B represents the column address of the LUT. In some situations, the input value B may be greater than the input value A. In those cases, the control engine on DRAM die may switch the input values A and B. Additionally, if the first bit of the input value B is equal to 1, then the input value A is equal to the reverse of all of the bits of input value A, and input value B is equal to the reverse of all of the bits of input value B. The control engine on DRAM die may use the final value of A as the row index and the final value of B as the column index. This algorithm guarantees that the actual LUT access is half of the original table.

Figure 7:
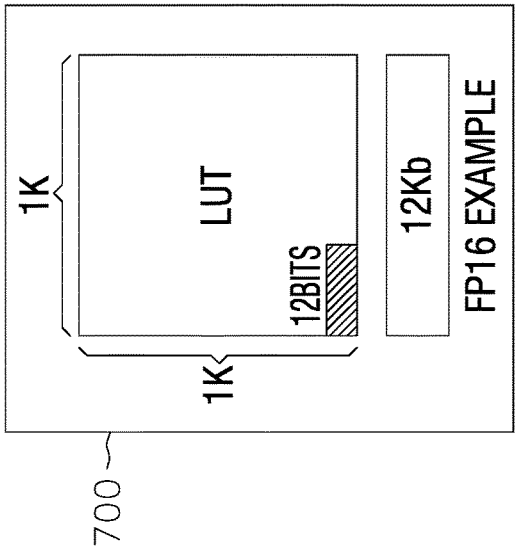
FIG. 7 shows a block diagram 700 representing a LUT, and a table 710 for displaying the number of bits used by a row index, column index, and result size of a LUT storing only partial product multiplication results.

FIG. 7 shows a block diagram 700 representing a LUT, and a table 710 for displaying the number of bits used by a row index, column index, and result size of a LUT storing only partial product multiplication results.

Referring to FIG. 7, in the example of the present embodiment, a 64-bit floating point has a 52-bit row index, a 52-bit column index, and a 54-bit result size.

Figure 8:
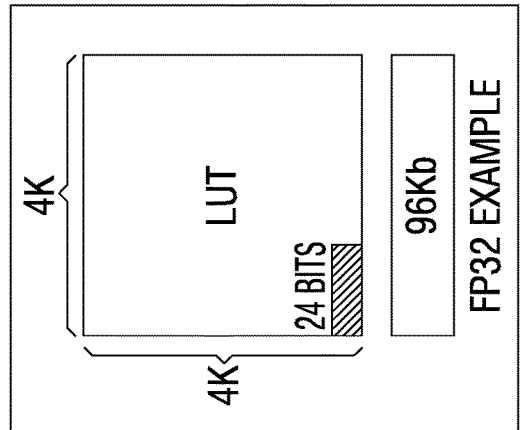
FIG. 8 shows a block diagram 800 representing a LUT that contains fraction partial product results.

FIG. 8 shows a block diagram 800 representing a LUT that contains fraction partial product results. The fraction part can be partitioned to multiple segments with equal size (e.g., fraction_length=fraction_segment*fraction_part). It may be suitable for the LUT to implement only the multiplication table of fraction segment multiplication. Intermediate results are not rounded and normalized. Instead, full precision of an intermediate result is kept, and is sent to an adder to shift or sum up the final result. An example of the fraction segment multiplication is provided below:

$$(A_1*2^{12}+A_0)*(B_1*2^{12}+B_0)=2^{12}*A_1*B_1+2^{12}*(A_1*B_0+B_1*A_0)+A_0*B_0$$

The normal expression can be displayed as follows:

$$24=12+12$$

$$2^{12}=4K$$

Figure 9:
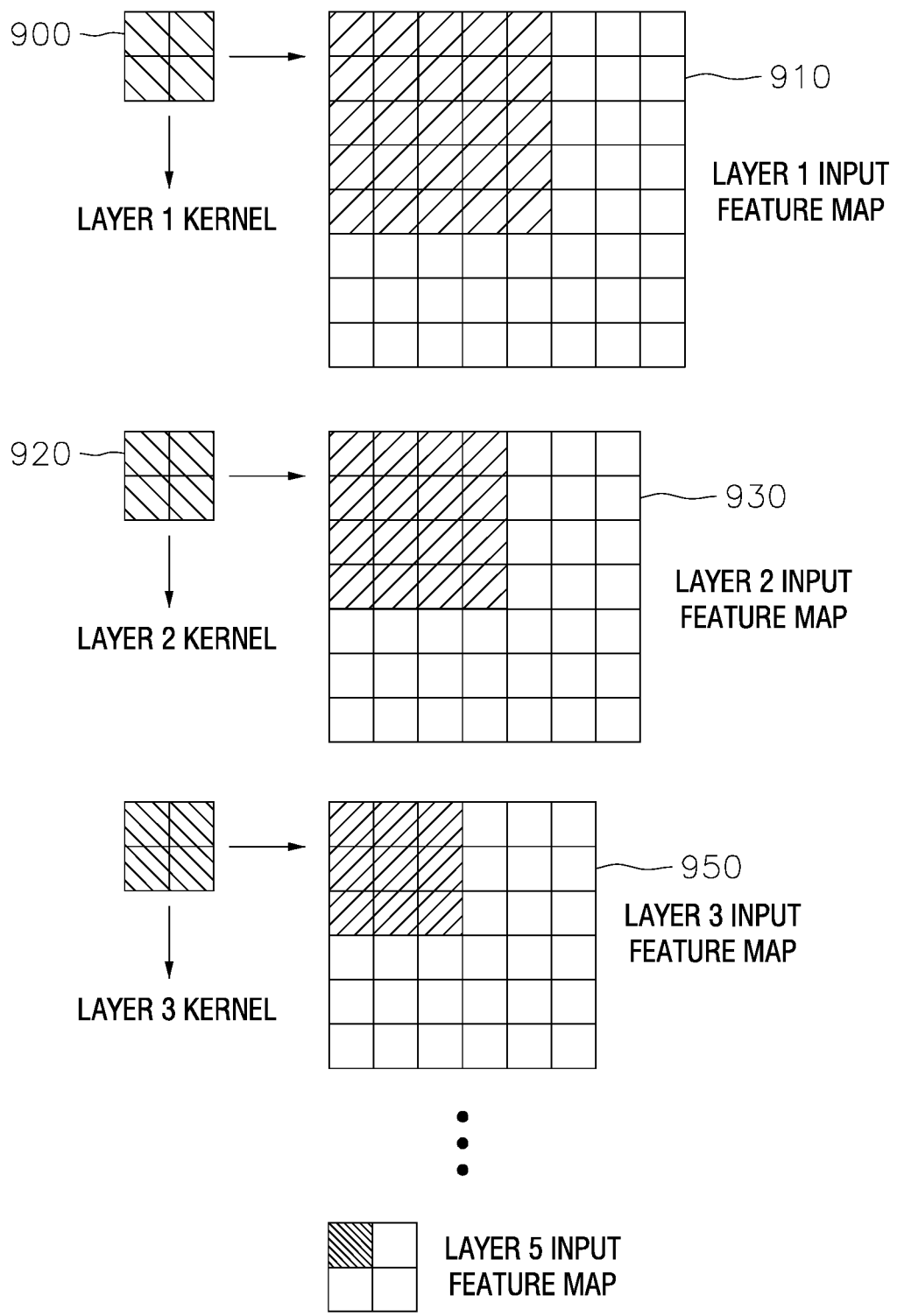
FIG. 9 provides a visual representation of a layer-by-layer convolution operation.

FIG. 9 provides a visual representation of a layer-by-layer convolution operation.

Referring to FIG. 9, the representation of the present embodiment is consistent with the embodiment illustrated in FIG. 2D. In conventional convolution operations, each layer must be calculated one by one. As shown in FIG. 9, the layer 1 kernel 900 will slide along (e.g., reading) every possible location in the layer 1 input feature map 910, convolve with the layer 1 input feature map 910 and generate one result in layer 2 input feature map 930. As a result, every element in layer 2 input feature map 930 is the result of the convolution of layer 1 kernel 900 with layer 1 input feature map 910. In the next step, the layer 2 kernel 920 will, similarly, slide along every possible location in layer 2 input feature map 930 to generate the results in layer 3 input feature map 950. This convolution operation will continue layer-by-layer for N layers. However, the storage of each of these intermediate results (e.g. layer 1, layer 2, layer 3 . . . layer N) becomes problematic. Storing all of the intermediate results on a DRAM die may require a relatively large amount of energy and storage space.

To address energy consumption and storage issues, the present embodiment focuses on a small computation pyramid. The small computation pyramid is represented by the shaded areas of the input feature maps (910, 930, 950). As each layer progresses, the shaded area decreases. When storing the intermediate results, only the shaded areas of the input feature maps are stored. Each of these intermediate results are stored on a buffer die rather than the DRAM die. The buffer die is illustrated as buffer die 270 in FIG. 2D. Retrieving the intermediate results from the buffer die uses less energy than retrieving the intermediate results from the DRAM die. In some embodiments the buffer could be a buffer on a memory die, a buffer on a logic die, or a separate buffer die.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A method for a memory lookup mechanism in a memory system, the method comprising:
    performing, by a memory die, a multiplication operation using a lookup table (LUT) methodology by accessing a LUT, which comprises floating point operation results, stored on the memory die;
    sending, by the memory die, a result of the multiplication operation to a logic die comprising a processor and a buffer; and
    performing, by the logic die, a matrix multiplication operation using the result of the multiplication operation performed on the memory die.

2. The method of claim 1, wherein the LUT methodology comprises a floating point full product multiplication method comprising:
    retrieving, by the memory die, a whole scalar multiplication result from the LUT using a whole scalar floating point input, the LUT comprising whole product multiplication results;
    sending, by the memory die, the whole scalar multiplication result of from the LUT to the buffer;
    sending, by the buffer, the whole scalar multiplication result to an accumulator on the logic die; and
    accumulating, by the accumulator, the whole scalar multiplication result.

3. The method of claim 1, wherein the LUT methodology comprises a floating point partial product multiplication method comprising:
    using, by the memory die, a fraction scalar floating point input to retrieve a partial product multiplication result from the LUT, which comprises partial product multiplication results;
    sending, by the memory die, the partial product multiplication result to the buffer;
    sending, by the buffer, the partial product multiplication result to an adjustor on the logic die;
    sending, by the adjustor, the partial product multiplication result to an accumulator on the logic die; and
    accumulating, by the accumulator, the partial product multiplication result.

4. The method of claim 1, wherein the LUT methodology comprises a floating point tensor operation method, the floating point tensor operation method comprising:
    retrieving, by the memory die, a tensor multiplication result from the LUT using a tensor floating point input, the LUT comprising tensor multiplication results;
    sending, by the memory die, the tensor multiplication result to the buffer; and
    sending, by the buffer, the tensor multiplication result to a tensor post-processor on the logic die.

5. The method of claim 1, wherein the LUT methodology comprises a floating point fused layer operation method, the method comprising:
    retrieving, by the memory die, a whole scalar multiplication result from the LUT using a whole scalar floating point, wherein the LUT comprises whole product multiplication results;
    sending, by the memory die, the whole product multiplication results to a buffer die comprising a plurality of buffers separate from the buffer of the logic die;
    sending, by the buffer die, the whole product multiplication result to the buffer of the logic die; and
    sending, by the buffer of the logic die, the whole product multiplication result to a tensor processor on the logic die.

6. The method of claim 1, further comprising:
    storing the LUT associated with a first type of operation on the memory die; and
    storing the LUT associated with a second type of operation that is different from the first type of operation on the memory die.

7. The method of claim 1, further comprising:
    reading every possible location in a first layer input feature map;
    convolving with the first layer input feature map with a first layer kernel; and
    generating results of a second layer input feature map based on the convolving.

8. A memory lookup mechanism comprising: a logic die comprising a processor and a buffer, wherein the processor performs a matrix multiplication operation using computational units; and a memory die comprising a lookup table (LUT),
    wherein the LUT comprises floating point operation results, and
    wherein the memory die performs operations comprising:
        accessing the LUT;
        performing a multiplication operation using a LUT methodology; and
        sending a result of the multiplication operation to the logic die for use by the logic die to perform matrix multiplication operations.

9. The memory lookup mechanism of claim 8, wherein the memory die performs operations further comprising:
    retrieving a whole scalar multiplication result from the LUT using a whole scalar floating point input, wherein the LUT comprises whole product multiplication results; and
    sending the whole scalar multiplication result from the LUT to the buffer.

10. The memory lookup mechanism of claim 9, wherein the logic die further comprises an accumulator, the accumulator performing operations comprising:
    receiving the whole scalar multiplication result from the buffer; and
    accumulating the whole scalar multiplication result.

11. The memory lookup mechanism of claim 8, wherein the memory die performs operations further comprising:

retrieving a partial product multiplication result from the LUT using a fraction scalar floating point input, wherein the LUT comprises partial product multiplication results; and sending the partial product multiplication result to the buffer.

12. The memory lookup mechanism of claim 11, wherein the logic die further comprises:

an adjustor, the adjustor receiving the partial product multiplication result from the buffer; and an accumulator, the accumulator performing operations comprising:

receiving the partial product multiplication result from the adjustor; and accumulating the partial product multiplication result.

13. The memory lookup mechanism of claim 8, wherein the memory die performs operations further comprising:

retrieving a tensor multiplication result from the LUT comprising tensor multiplication results using a tensor floating point input; and sending the tensor multiplication result to the buffer.

14. The memory lookup mechanism of claim 13, wherein the logic die further comprises a tensor post-processor receiving the tensor multiplication result from the buffer.

15. The memory lookup mechanism of claim 8, wherein the memory die performs operations further comprising:

retrieving a whole scalar multiplication result from the LUT using a whole scalar floating point, wherein the LUT comprises whole product multiplication results; and sending the whole product multiplication results to a buffer die.

16. The memory lookup mechanism of claim 15, wherein the logic die further comprises a tensor processor, the processor receiving the whole product multiplication results from the buffer die.

17. The memory lookup mechanism of claim 8, wherein the logic die further comprises an accelerator die.

18. The memory lookup mechanism of claim 8, wherein the memory die comprises a dynamic random access memory (DRAM) die.

19. A memory die comprising a lookup table (LUT) stored thereon, and configured to perform:

a floating point full product multiplication method comprising:

retrieving, by the memory die, a whole scalar multiplication result from the LUT using a whole scalar floating point input, the LUT comprising whole product multiplication results;

sending, by a buffer, the whole scalar multiplication result to an accumulator; and accumulating, by the accumulator, the whole scalar multiplication result;

a floating point partial product multiplication method comprising:

retrieving, by the memory die, a partial product multiplication result from the LUT using a fraction scalar floating point input, the LUT comprising partial product multiplication results;

sending, by the memory die, the partial product multiplication result to the buffer;

sending, by the buffer, the partial product multiplication result to an adjustor;

accumulating, by the accumulator, the partial product multiplication result;

a floating point tensor operation method comprising:

retrieving, by the memory die, a tensor multiplication result from the LUT using a tensor floating point input, the LUT comprising tensor multiplication results;

sending, by the memory die, the tensor multiplication result to the buffer;

sending, by the buffer, the tensor multiplication result to a tensor post-processor; and a floating point fused layer operation method comprising:

retrieving, by the memory die, a whole scalar multiplication result from the LUT using, a whole scalar floating point wherein the LUT comprises whole product multiplication results;

sending, by the memory die, the whole product multiplication results to a buffer die comprising a plurality of buffers;

sending, by the buffer die, the whole product multiplication result to the buffer; and sending, by the buffer, the whole product multiplication result to a tensor processor.

* * * * *